United States Patent
Gao et al.

(10) Patent No.: US 8,929,474 B2
(45) Date of Patent: Jan. 6, 2015

(54) SYSTEMS AND METHODS FOR OPTIMIZING SOUNDING INTERVAL

(71) Applicant: QUALCOMM Incorporated, San Diego, CA (US)

(72) Inventors: Qinghai Gao, Sunnyvale, CA (US); Balaji Srinivasan Babu, Chennai (IN); Shu Du, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 13/830,177

(22) Filed: Mar. 14, 2013

(65) Prior Publication Data

US 2014/0269961 A1  Sep. 18, 2014

(51) Int. Cl.
*H04B 7/02* (2006.01)
*H04L 1/02* (2006.01)
*H04L 1/00* (2006.01)

(52) U.S. Cl.
CPC .................................. *H04L 1/0027* (2013.01)
USPC .............................. 375/267; 370/329; 370/319

(58) Field of Classification Search
CPC ................. H04L 5/0048; H04L 1/003; H04L 2025/03426; H04L 25/0204; H04L 25/0226; H04L 1/0025; H04L 1/0027; H04L 5/0023; H04L 12/2801; H04B 7/0413; H04B 7/0626; H04B 7/0851; H04B 7/0613; H04B 7/2612; H04B 3/238; H04W 84/12; H04W 16/02; H04W 80/00
USPC ......... 370/338, 334, 252, 328, 329, 342, 319; 375/367
See application file for complete search history.

(56) References Cited

U.S. PATENT DOCUMENTS

| | | | |
|---|---|---|---|
| 6,477,368 B1 * | 11/2002 | Korneluk et al. | 455/423 |
| 7,280,804 B2 * | 10/2007 | Jacobsen et al. | 455/67.11 |
| 7,412,020 B1 * | 8/2008 | Misra et al. | 375/377 |
| 7,889,701 B2 * | 2/2011 | Malik et al. | 370/334 |
| 8,054,898 B2 | 11/2011 | Tong et al. | |
| 8,271,043 B2 | 9/2012 | Kim et al. | |
| 2003/0103521 A1 * | 6/2003 | Raphaeli et al. | 370/445 |

(Continued)

FOREIGN PATENT DOCUMENTS

WO  WO-2011035204 A2  3/2011
WO  WO-2011103367 A1  8/2011

OTHER PUBLICATIONS

Redieteab, G.; Cariou, L.; Christin, P.; Helard, J. -F, "PHY+MAC channel sounding interval analysis for IEEE 802.11ac MU-MIMO," Wireless Communication Systems (ISWCS), 2012 International Symposium on , vol., No., pp. 1054,1058, Aug. 28-31, 2012.*

(Continued)

*Primary Examiner* — Daniel Washburn
*Assistant Examiner* — Amneet Singh
(74) *Attorney, Agent, or Firm* — Mahamedi Paradice LLP

(57) ABSTRACT

Systems and methods are disclosed for optimizing the sounding interval in a MIMO communications system. Following a channel sounding protocol, net throughput may be estimated over time. The sounding interval may correspond to the period of time between the end of the sounding protocol and a time when the estimated net throughput is maximized. Estimating net throughput may involve estimating the number of bits that may be successfully transmitted divided by the time required to transmit. The number of bits that may be successfully transmitted may be estimated from a statistical channel profile including goodput.

18 Claims, 7 Drawing Sheets

(56) References Cited

U.S. PATENT DOCUMENTS

| | | | |
|---|---|---|---|
| 2004/0192216 A1* | 9/2004 | Marzetta et al. | 455/67.14 |
| 2006/0256904 A1* | 11/2006 | Doi | 375/349 |
| 2006/0274847 A1* | 12/2006 | Molisch et al. | 375/267 |
| 2008/0095223 A1* | 4/2008 | Tong et al. | 375/228 |
| 2008/0101310 A1* | 5/2008 | Marzetta | 370/342 |
| 2009/0196372 A1* | 8/2009 | Zhang et al. | 375/267 |
| 2009/0225879 A1* | 9/2009 | Kloos et al. | 375/260 |
| 2009/0290563 A1* | 11/2009 | Gu et al. | 370/338 |
| 2010/0296591 A1 | 11/2010 | Xu et al. | |
| 2011/0075607 A1* | 3/2011 | Kim et al. | 370/328 |
| 2011/0188598 A1* | 8/2011 | Lee et al. | 375/267 |
| 2011/0205968 A1* | 8/2011 | Kim et al. | 370/328 |
| 2011/0299480 A1* | 12/2011 | Breit et al. | 370/329 |
| 2012/0040629 A1* | 2/2012 | Li et al. | 455/91 |
| 2012/0213169 A1 | 8/2012 | Wang et al. | |
| 2013/0301502 A1* | 11/2013 | Kwon et al. | 370/311 |

OTHER PUBLICATIONS

Xiangyun Zhou; Sadeghi, P.; Lamahewa, Tharaka A., "Optimizing Training-Based MIMO Systems: How Much Time is Needed for Actual Transmission?," Vehicular Technology Conference (VTC 2010-Spring), 2010 IEEE 71st , vol., No., pp. 1,5, May 16-19, 2010.*

Hadj-Kacem, I.; Sellami, N.; Fijalkow, I.; Roumy, A., "Training Interval Length Optimization for MIMO Flat Fading Channels Using Decision-Directed Channel Estimation," Wireless and Mobile Computing, Networking and Communications, 2009. WIMOB 2009. IEEE International Conference on , vol., No., pp. 24,29, Oct. 12-14, 2009.*

Hassibi, B.; Hochwald, B.M., "How much training is needed in multiple-antenna wireless links?," Information Theory, IEEE Transactions on , vol. 49, No. 4, pp. 951,963, Apr. 2003.*

Osada, S.; Yokohira, T.; Wang Hui; Okayama, K.; Yamai, N., "Performance Improvement of TCP using Performance Enhancing Proxies—Effect of Premature ACK Transmission Timing on Throughput—," Information and Telecommunication Technologies, 2005. APSITT 2005 Proceedings. 6th Asia-Pacific Symposium on , vol., No., pp. 7,12, Nov. 9-10, 2005.*

Gong, M.X.; Perahia, E.; Want, R.; Shiwen Mao, "Training protocols for multi-user MIMO wireless LANs," Personal Indoor and Mobile Radio Communications (PIMRC), 2010 IEEE 21st International Symposium on , vol., No., pp. 1218,1223, Sep. 26-30, 2010.*

Pohl, V.; Phuc Hau Nguyen; Jungnickel, V.; Von Helmolt, C., "Continuous flat-fading MIMO channels: achievable rate and optimal length of the training and data phases," Wireless Communications, IEEE Transactions on , vol. 4, No. 4, pp. 1889,1900, Jul. 2005.*

Hung, K-C.; Lin, David W., "Joint Channel Estimation and Data Detection for Space-Frequency Transformed MIMO OFDM System" Taiwan-Japan Joint Conference on Communications Technology 2007, p. 36-40.*

Savazzi, Stefano; Spagnolini, Umberto, "Optimizing Training Lengths and Training Intervals in Time-Varying Fading Channels," Signal Processing, IEEE Transactions on , vol. 57, No. 3, pp. 1098,1112, Mar. 2009.*

Mehmood, Asad; Cheema, Waqas Aslam, "Channel Estimation for LTE Downlink", Blekinge Institute of Technology, pp. 1-86, Sep. 2009.*

International Search Report and Written Opinion—PCT/US2014/028873—ISA/EPO—Jun. 10, 2014.

* cited by examiner

SYSTEMS AND METHODS FOR OPTIMIZING SOUNDING INTERVAL

FIELD OF THE PRESENT DISCLOSURE

This disclosure generally relates to wireless communication systems and more specifically to systems and methods for statistically estimating channel characteristics.

BACKGROUND

A current area of development in wireless communications systems involves the use of transmitters and receivers having multiple antennas. Generally, these are known as multiple-input multiple-output (MIMO) systems and offer increased peak data rate, spectral efficiency, and quality of service though the use of a plurality of parallel data streams.

Relative to other wireless technologies, MIMO may enable substantial gains in both system capacity and transmission reliability without requiring an increase in frequency spectrum resources. By increasing the number of transmit and receive antennas, the capacity of a MIMO channel may be increased while also reducing the probability of all sub-channels between the transmitter and receiver fading simultaneously. However, recovery of transmitted information in a MIMO system may be relatively more complex and correspondingly benefit from accurate characterization of the channel. Accordingly, any of a variety of channel models may be used to tailor aspects of the operation of the transceiver to help optimize performance. Further, the characteristics of the channel may vary over time, which may warrant selecting different models to more accurately characterize the channel. In particular, operation in multi user (MU) MIMO mode may be relatively sensitive to the channel statistics. It would therefore be desirable to determine channel statistics in order to allow improved operation of the system.

Another aspect of the operation of MIMO systems is the capability to operate in a variety of modes. MIMO systems can be divided into operational classes including single-user MIMO (SU MIMO) and multi-user MIMO (MU MIMO). Further MU MIMO modes may be subdivided depending upon the number of users receiving the transmission. For example, MU2 may refer to a MU MIMO mode involving a simultaneous transmission to two users, and more generally, MUn may involve transmission to n users. An objective of SU MIMO operation may be to increase peak data rate per terminal, whereas an objective in MU MIMO may be to increase sector (or service cell) capacity. Operation in each of these classes has corresponding advantages. For example, SU MIMO exploits spatial multiplexing to provide increased throughput and reliability, while MU MIMO exploits multi-user multiplexing (or multi-user diversity) to further gains in capacity. Additionally, MU MIMO benefits from spatial multiplexing even when employing a receiver having a single antenna. As such, it would be desirable for the MIMO system to select from the available operating modes in order to improve overall performance of the system.

Due to the complexity associated with providing multiple transmit streams having adjusted phase and amplitude, MIMO systems rely on having accurate and current channel state information (CSI). In a closed-loop beamforming system, the channel may be estimated using a sounding protocol. By sending a known pattern of information, characteristics of the signal appearing at the receiver may be used to determine the CSI, which is then fed back to the transmitter. However, the transmission of the sounding signal represents overhead that may limit the overall throughput of the system. Since the benefit of providing current CSI by performing more frequent sounding protocols is offset by the increase in overhead, it would be desirable to select a sounding interval that optimizes performance.

This disclosure satisfies the goals identified above as well as other goals and needs.

SUMMARY

This disclosure includes methods for communication in a multiple input multiple output (MIMO) system. One suitable method includes performing a channel sounding protocol over a sounding time, estimating net throughput over time following the channel sounding protocol, identifying a time corresponding to a maximum net throughput, and determining a sounding interval corresponding to a period of time between an end of the sounding protocol and the time corresponding to the maximum net throughput. Further, a plurality of bins may be defined, beginning with a first bin and extending from the end of the sounding protocol.

In one aspect, estimating net throughput over time may include estimating a number of bits that may be successfully transmitted in each bin, selecting a second bin subsequent to the first bin, summing bits that may be successfully transmitted during the first bin, during the second bin and during any intervening bins between the first bin and the second bin and dividing the summed bits by a duration of time extending from the first bin to the second bin plus the sounding time. Further, identifying the time corresponding to the maximum net throughput may include selecting the second bin such that net throughput at the second bin is the maximum net throughput.

In one embodiment, estimating the number of bits that may be successfully transmitted in each bin may include statistically determining goodput for each bin. Accordingly, statistically determining goodput may include transmitting a first plurality of packets of information over at least one preceding sounding interval initiated by performing a sounding protocol, wherein each packet has a transmission time, is addressed to at least one station and is transmitted in at least one MIMO mode, binning each packet of information in one bin of the plurality of bins based, at least in part, on the transmission time of each packet relative to the sounding protocol of the at least one preceding sounding interval, and determining a goodput value corresponding to the bin, the station and the MIMO mode for each packet that is acknowledged.

In one aspect, determining the sounding interval may include multiplying a number of bins between the first bin and the second bin, inclusive, by a duration of each bin.

The disclosure also includes systems for wireless communication. For example, a wireless communications device configured to operate in a multiple input multiple output (MIMO) system may have a plurality of transmitter units and a statistics estimator, wherein the transmitter units are configured to transmit a channel sounding protocol over a sounding time and wherein the statistics estimator is configured to estimate net throughput over time following the channel sounding protocol, identify a time corresponding to a maximum net throughput, and determine a sounding interval corresponding to a period of time between an end of the sounding protocol and the time corresponding to the maximum net throughput. Further, the statistics estimator may define a plurality of bins beginning with a first bin and extending from the end of the sounding protocol. The statistics estimator may also estimate net throughput over time by estimating a number of bits that may be successfully transmitted in each bin, selecting a second bin subsequent to the first bin, summing bits that may be successfully transmitted during the first bin, during the second bin and during any intervening bins between the first bin and the second bin and dividing the summed bits by a duration of time extending from the first bin to the second bin plus the sounding time. In addition, the statistics estimator is configured to identify the time corresponding to the maximum net throughput by selecting the second bin such that net throughput at the second bin is the maximum net throughput.

In one embodiment, the statistics estimator may estimate the number of bits that may be successfully transmitted in each bin based, at least in part, on a statistically determined goodput for each bin. Further, the transmitter units may transmit a first plurality of packets of information over at least one preceding sounding interval initiated by performing a sounding protocol, wherein each packet has a transmission time, is addressed to at least one station and is transmitted in at least one MIMO mode and the statistics estimator may determine goodput by binning each packet of information in one bin of the plurality of bins based, at least in part, on the transmission time of each packet relative to the sounding protocol of the at least one preceding sounding interval and determining a goodput value corresponding to the bin, the station and the MIMO mode for each packet that is acknowledged.

In one aspect, the statistics estimator may determine the sounding interval by multiplying a number of bins between the first bin and the second bin, inclusive, by a duration of each bin.

The disclosure also includes a non-transitory processor-readable storage medium for operating a multiple input multiple output (MIMO) wireless communications device having instructions including instructions to cause the wireless communications device to perform a channel sounding protocol over a sounding time, instructions to cause the wireless communications device to estimate net throughput over time following the channel sounding protocol, instructions to cause the wireless communications device to identify a time corresponding to a maximum net throughput, and instructions to cause the wireless communications device to determine a sounding interval corresponding to a period of time between an end of the sounding protocol and the time corresponding to the maximum net throughput. Further, the storage medium may include instructions to cause the wireless communications device to defining a plurality of bins beginning with a first bin and extending from the end of the sounding protocol.

In one aspect, the instructions to cause the wireless communications device to estimate net throughput over time may include instructions to cause the wireless communications device to estimate a number of bits that may be successfully transmitted in each bin, instructions to cause the wireless communications device to select a second bin subsequent to the first bin, instructions to cause the wireless communications device to sum bits that may be successfully transmitted during the first bin, during the second bin and during any intervening bins between the first bin and the second bin and instructions to cause the wireless communications device to divide the summed bits by a duration of time extending from the first bin to the second bin plus the sounding time. Further, the instructions to cause the wireless communications device to identify the time corresponding to the maximum net throughput may include instructions to cause the wireless communications device to select the second bin such that net throughput at the second bin is the maximum net throughput.

In one embodiment, the instructions to cause the wireless communications device to estimate the number of bits that may be successfully transmitted in each bin may include instructions to cause the wireless communications device to statistically determine a goodput for each bin. As such, the instructions to cause the wireless communications device to determine goodput may include instructions to cause the wireless communications device to transmit a first plurality of packets of information over at least one preceding sounding interval initiated by performing a sounding protocol, wherein each packet has a transmission time, is addressed to at least one station and is transmitted in at least one MIMO mode, instructions to cause the wireless communications device to bin each packet of information in one bin of the plurality of bins based, at least in part, on the transmission time of each packet relative to the sounding protocol of the at least one preceding sounding interval, and instructions to cause the wireless communications device to determine a goodput value corresponding to the bin, the station and the MIMO mode for each packet that is acknowledged.

In a further aspect, the instructions to cause the wireless communications device to determine the sounding interval may include instructions to cause the wireless communications device to multiply a number of bins between the first bin and the second bin, inclusive, by a duration of each bin.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION

Figure 1:
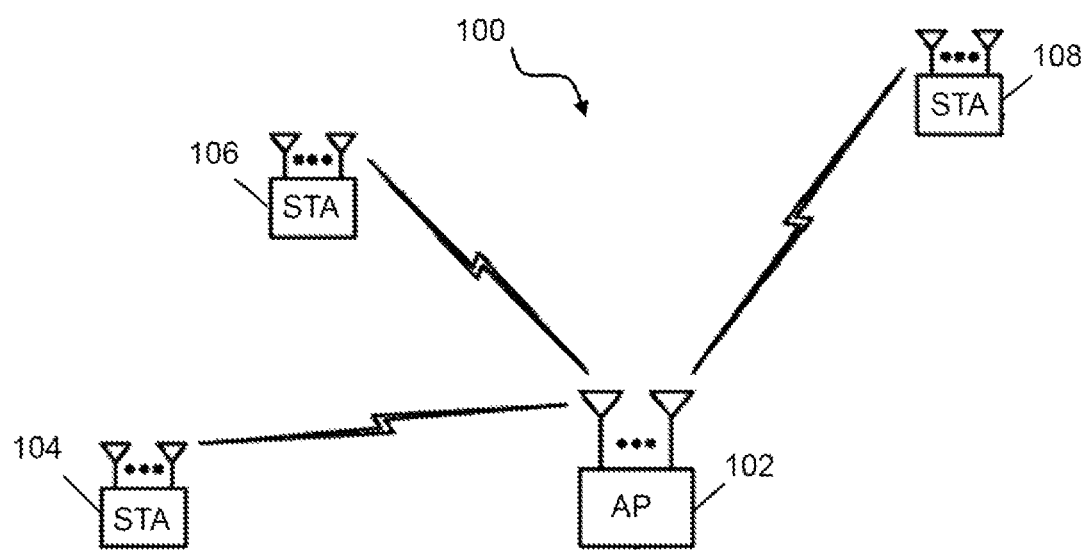
FIG. 1 schematically depicts a MIMO wireless communications system, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

To help illustrate the systems and methods of this disclosure, an exemplary multiple-input multiple-output (MIMO) wireless communication system 100 is shown in FIG. 1, including access point (AP) 102. An access point is generally a fixed station that communicates with the user terminals and may also be referred to as a base station or some other terminology. As shown, AP 102 communicates with one or more stations (STAs), such as STA 104, STA 106 and STA 108. A station may be also be referred to as a user terminal, a wireless device, or any other suitable terminology. For simplicity, one AP and three stations are shown, but the techniques of this disclosure may be applied to any other suitable number of network nodes. AP 102 may communicate with one or more user terminals at any given moment on the downlink and uplink. The downlink (i.e., forward link) is the communication link from AP 102 to STAs 104, 106 and 108, and the uplink (i.e., reverse link) is the communication link from STAs 104, 106 and 108 to AP 102.

MIMO system 100 employs multiple transmit and multiple receive antennas for data transmission on the downlink and uplink. AP 102 may include n antennas to provide multiple-input (MI) for downlink transmissions and the multiple-output (MO) for uplink transmissions. A selected subset of any stations associated with AP 102 may provide the MO for downlink transmissions and the MI for uplink transmissions. In some embodiments, the subset of stations may include up to n stations, although multiplexing techniques may be employed to increase the number of stations in the subset. The stations in the selected subset may have the same number or a different number of antennas.

Figure 2:
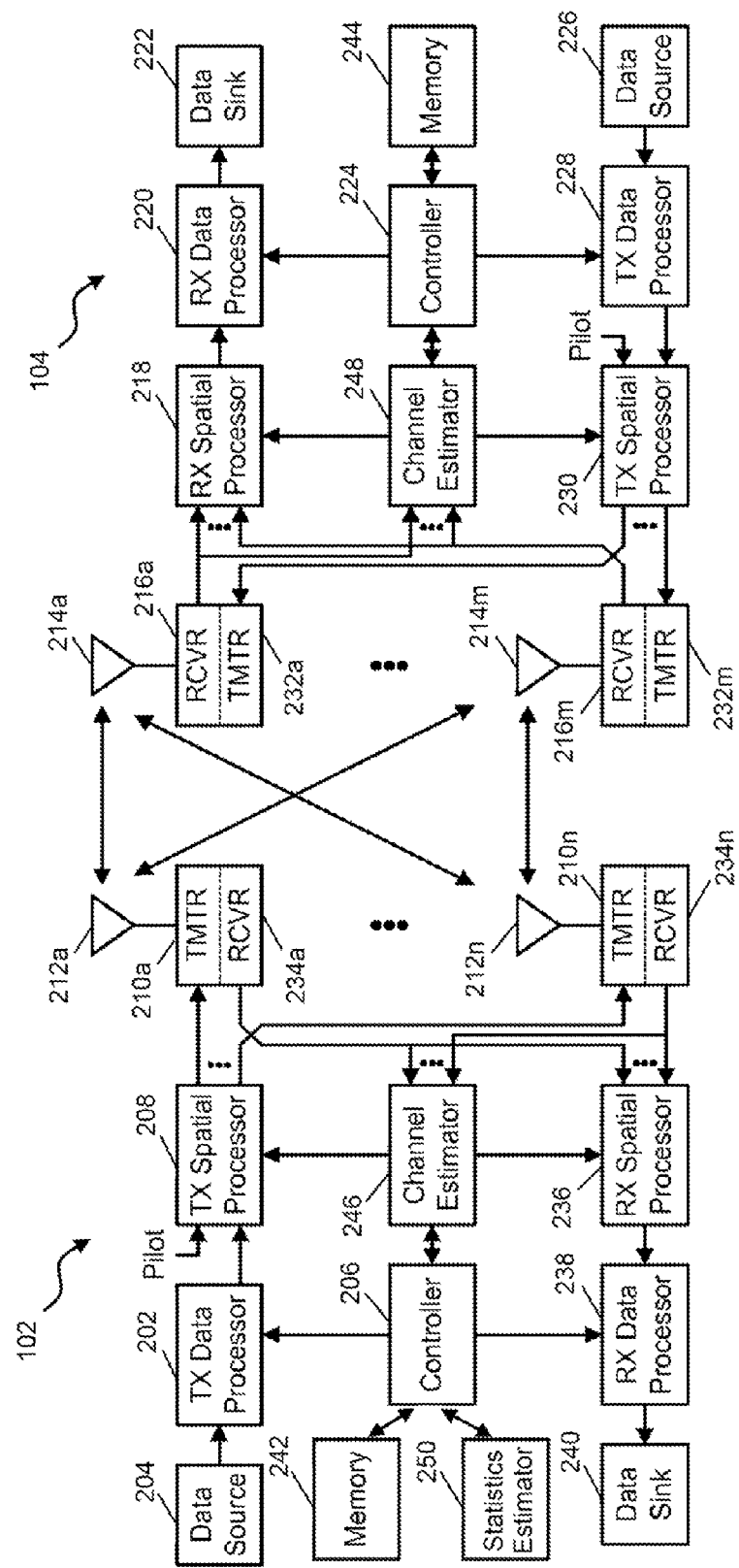
FIG. 2 schematically depicts functional blocks of a MIMO access point and MIMO station, according to one embodiment.

Additional details regarding embodiments of AP 102 and STA 104 are depicted as high level schematic blocks in FIG. 2. Although not shown, STAs 106 and 108 may be similarly configured. AP 102 may be a transmitting entity for the downlink and a receiving entity for the uplink while STA 104 may be a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. Beam-steering or another suitable spatial processing technique may be used by AP 102 and STAs 104. On the downlink, TX data processor 202 of AP 102 receives traffic data from data source 204 and signaling and other data from a controller 206. TX data processor 202 may format, encode, interleave, and modulate (or symbol map) the different types of data and provide data symbols. In turn, TX spatial processor 208 performs spatial processing on the data symbols from TX data processor 202, multiplexes in pilot symbols as appropriate (e.g., for channel estimation, calibration, and so on), performs scaling with a correction matrix (if applicable), and provides n streams of transmit symbols to transmitter units 210a through 210n. Each transmitter unit 210 conditions a respective transmit symbol stream to generate a corresponding downlink signal. The downlink signals from transmitter units 210 are then transmitted from n antennas 212a through 212n.

Correspondingly, STA 104 includes m antennas 214a through 214m, wherein m may be one or more, that may receive the downlink signals, such that each antenna provides a received signal to respective receiver units 216a through 216m. Each receiver unit 216 performs processing complementary to that performed at transmitter units 210 and provides received symbols. RX spatial processor 218 may perform scaling with a correction matrix (if applicable) and further performs receiver spatial processing on the received symbols from all m receiver units 216 to obtain detected symbols, which are estimates of the data symbols sent by AP 102. RX data processor 220 demodulates (or symbol demaps), deinterleaves, and decodes the detected symbols and provides decoded data to data sink 222 for storage and/or a controller 224 for further processing.

Processing for the uplink may be the same or different from the processing for the downlink. Data received from data source 226 and signaling are encoded, interleaved, and modulated by TX data processor 228, and further spatially processed, multiplexed with pilot symbols, and scaled with a correction matrix (if applicable) by TX spatial processor 230 to obtain transmit symbols. The transmit symbols are further processed by transmitter units 232a through 232m to obtain m uplink signals, which are then transmitted m antennas 214a through 214m to AP 102. At AP 102, the uplink signals are received by antennas 212, conditioned by receiver units 234a through 234n and processed by RX spatial processor 236 and RX data processor 238 in a manner complementary to that performed at STA 104 for delivery to data sink 240.

Controllers 206 and 224 control the operation of various processing units at AP 102 and STA 104, respectively. Memory units 242 and 244 store data and program codes used by controllers 206 and 224, respectively. Channel estimators 246 and 248 of AP 102 and STA 104, respectively, may be configured to estimate the channel response using a channel sounding process. AP 102 may also include statistics estimator 250 that provides a statistical estimate of the channel profile according to the techniques of this disclosure.

When employing a wireless protocol such as an Institute of Electrical and Electronics Engineers (IEEE) 802.11 standard, transmissions may be organized into discrete units of information. Information is packetized at an upper level of the wireless protocol stack, such as the network layer. As the information is passed to the data link layer, the packets or datagrams may be organized into frames having a defined format. In one aspect, information received at the media access control (MAC) sublayer of the data link layer may be organize in MAC service data units (MSDUs). The MAC layer may wrap each MSDU in a MAC header to form a MAC protocol data unit (MPDU) that is delivered to the physical (PHY) layer. In turn, the PHY layer wraps the MPDU in a PHY layer convergence protocol (PLCP) header to form a PLCP protocol data unit (PPDU) which may be modulated and transmitted over the wireless medium. To reduce the framing overhead associated with wrapping each MPDU in a PLCP header, multiple MPDUs may be grouped to form an aggregate MPDU (A-MPDU), which requires only one PCLP header. Under current standards, an A-MPDU may contain 64 MPDUs, although the techniques of this disclosure are not limited in this respect.

Figure 3:
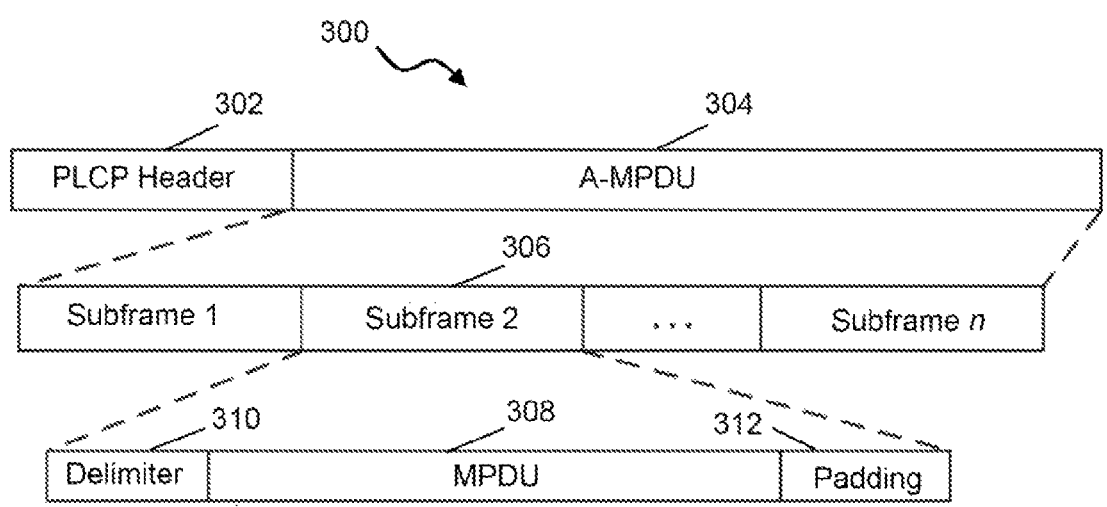
FIG. 3 depicts a format of a PPDU containing an A-MPDU.

An exemplary format of a PPDU formed from an A-MPDU is depicted in FIG. 3. As shown, PPDU 300 includes PLCP header 302 and A-MPDU frame body 304, which includes one or more subframes, such as subframe 1 through n. Further, each subframe includes an MPDU so that A-MPDU frame body 304 has n MPDUs. For example, Subframe 2 306 is formed from MPDU 308 and bounded by delimiter 310 and padding 312 as warranted to align with an interleaved symbol boundary.

In the context of MIMO system 100, transmissions from AP 102 to one of STA 104, 106 or 108 may be termed single-user MIMO (SU MIMO) when the MPDU or the entire A-MPDU is devoted to a single station. Since the multiple transmit chains may each carry a data stream for the single user, the data rate in SU MIMO mode may be increased as compared to conventional wireless communications systems. Alternatively, transmissions from AP 102 to two or more of STAs 104, 106 and 108, or more generally to the selected subset of associated stations, employ an A-MPDU formed from MPDUs designated for each station in the subset and may be termed multi-user MIMO (MU MIMO). Although only some of the data in each A-MPDU is intended for a given station, the gain in diversity represented by the use of multiple antennas may provide increased reliability and capacity. MU MIMO may be further characterized by the number of users included in the transmission. For example, transmission of an A-MPDU by AP 102 having one or more MPDUs for STA 104 and one or more MPDUs for STA 106 may be termed two-user MU MIMO (MU2 MIMO) mode while transmission of an A-MPDU by AP 102 having one or more MPDUs for STA 104, one or more MPDUs for STA 106 and one or more MPDUs for STA 108 may be termed three-user MU MIMO (MU3 MIMO) mode. In general, the MU MIMO mode may be characterized by the number of intended receiving stations.

To provide statistical information regarding performance of the MIMO system, statistics estimator 250 of AP 102 may be configured to generate and update a table of entries corresponding to a given characteristic of the operation of MIMO system 100. In one aspect, the characteristic may be related to throughput, as throughput is an important performance metric and optimizing throughput may often be a goal. In particular, throughput may be expressed in terms of goodput, such that goodput reflects the throughput experienced by the receiver less any overhead associated with the communications systems and an errors occurring during transmission.

A common aspect shared by wireless communication systems is that the environment may be constantly changing, as a result of relative motion between nodes in the network, varying multipath effects and other factors. Due to the complexity associated with providing multiple transmit streams having adjusted phase and amplitude, MIMO system 100 may employ a closed-loop beamforming system to help provide current channel state information (CSI). For example, channel estimators 246 and 248 may employ a sounding protocol, in which a known pattern of information is sent periodically. The time period between sounding events may be termed a "sounding interval." By analyzing characteristics of the signal appearing at the receiver, CSI may be determined and fed back to transmitter units 208 and 232. Due to the time varying nature of the channel, the CSI may be most accurate immediately following the sounding transmission and, depending upon how static the channel is, may degrade more slowly or more quickly over time. Since the performance of MIMO system 100 may depend upon the accuracy of the CSI used to control the transmitters, it may also degrade over the sounding interval.

Accordingly, statistics estimator 250 may be configured to correlate determined goodput over time, relative to the last channel sounding transmission. In one aspect, a plurality of sequential bins 1 through k, each having a defined duration D, may be established following each channel sounding event. Together, bins 1 through k may correspond to or extend beyond a given sounding interval. The duration D may be selected so that the channel does not vary too significantly during each bin. For example, a suitable duration D may be approximately 2 ms. Statistics estimator 250 may assign each MPDU transmitted by AP 102, sent either as a single MPDU or as part of an A-MPDU, to one of the bins depending upon the transmission time relative to the last sounding event.

In turn, for each bin, statistics estimator 250 may determine a goodput for each station, such as STAs 104, 106 and 108, based upon acknowledgement communications. For example, a receiving station may transmit an acknowledgement (ACK) for each MPDU successfully received. To accommodate the multiple MPDUs transmitted in an A-MPDU, the receiving stations may employ a block acknowledgement (BA) process. Rather than transmitting an individual ACK for every MPDU, the success or failure of multiple MPDUs addressed to a given station may be acknowledged with a BA frame, having a bitmap indicating the success or failure of reception of each MPDU. The PHY and MAC layers of AP 102 employ the ACK and BA communications to identify MPDUs that were not successfully received and may require retransmission. By obtaining the ACK and BA information from transmitter units 210, statistics estimator 250 may estimate goodput based on the size of acknowledged MPDUs and an instantaneous packet error rate (PER) for unacknowledged MPDUs for each bin and each station.

Further, a performance characteristic such as goodput may also depend upon the MIMO mode used by AP 102 to transmit the information. As noted above, the SU MIMO mode may be tailored to provide increased data rate while the MU MIMO modes may provide increased reliability. Therefore, statistics estimator 250 may also be configured to classify the goodput for each station on the basis of MIMO mode. In this manner, a channel profile based on goodput statistics for each MIMO mode may be obtained.

In one aspect, statistics estimator 250 may determine a goodput value for each MIMO mode of each station for each bin. For example, statistics estimator 250 may maintain a goodput table having entries in the form of a 3-tuple: Goodput (userID, mode, bin), wherein userID may identify the station, mode may identify the SU or MU MIMO mode and bin may identify the bin number.

In another aspect, statistics estimator 250 may use information from the goodput table to provide a quantized goodput profile for each station. For example, performance in a given MIMO mode may be expressed as a profile score that represents the length of time required for the determined goodput to decrease by a predetermined percentage, such as 50%, from a peak value. Any other suitable integration or quantization of the goodput values determined by statistics estimator 250 may be used as desired. Further, the profile score for each mode may be weighted by a suitable coefficient and summed to derive an overall profile score for a given station. By analyzing changes to the overall profile score over time, the channel variations for the station may be determined.

As noted, statistics estimator 250 may populate the goodput table by assigning MPDUs to one of the k bins based upon the transmit time relative to the last sounding event. Correspondingly, it may be desirable to update one or more of the 3-goodput entries using a goodput values calculated from one or more MPDUs transmitted in subsequent sounding intervals. The entries may be updated as desired with more recently-determined goodput information using any suitable finite or infinite impulse filter, of any order. In one embodiment, the entries may be updated using equation (1):

$$\text{Goodput}(\text{userId},\text{mode},\text{bin}) = a \cdot \text{Goodput}(\text{userId},\text{mode},\text{bin}) + (1-a) \cdot \text{LatestGoodput}(\text{userId},\text{mode},\text{bin}) \quad (1)$$

The coefficient a may be selected to determine the rate at which the table reacts to newly-determined goodput values. Relatively larger values of a may be employed to slow the rate of change of table entries to accommodate short duration shadowing or brief interference events while relatively smaller values of a may be employed to achieve a more reactive table to accommodate rapidly changing channel conditions, such as in an environment experiencing frequent switches between static and mobile conditions.

In another aspect, MIMO system 100 may employ varying communication strategies, particularly in response to changing channel conditions such as between mobile and static. As a result, MPDUs may not be evenly spread across the bins for all stations and all MIMO modes during a given sounding interval. Useful characterization may still be made for bins that are not directly populated by information based upon received acknowledgements. As desired, table entries that do not have data derived directly from an acknowledged MPDU may be populated with derived data interpolated or extrapolated from one or more adjacent bins at the end of each sounding interval. These entries may be determined using any suitable technique, including, e.g., polynomial fit routines, generalized function learning procedures or linear combinations of exponential functions. An extrapolated or interpolated entry may also be updated or used to update an entry using any suitable filtering technique, as described above.

Further, statistics estimator 250 may determine the goodput statistics from information readily available at the PHY layer of transmitter units 210. Since characteristics such as the size and transmission time for each MPDU and any corresponding acknowledgments received from the associated stations are known, statistics estimator 250 may be implemented in upper levels of the WLAN protocol stack, such as through software routines performed by controller 206. Accordingly, the techniques of this disclosure impart little or no additional overhead on the WLAN hardware.

Figure 4:
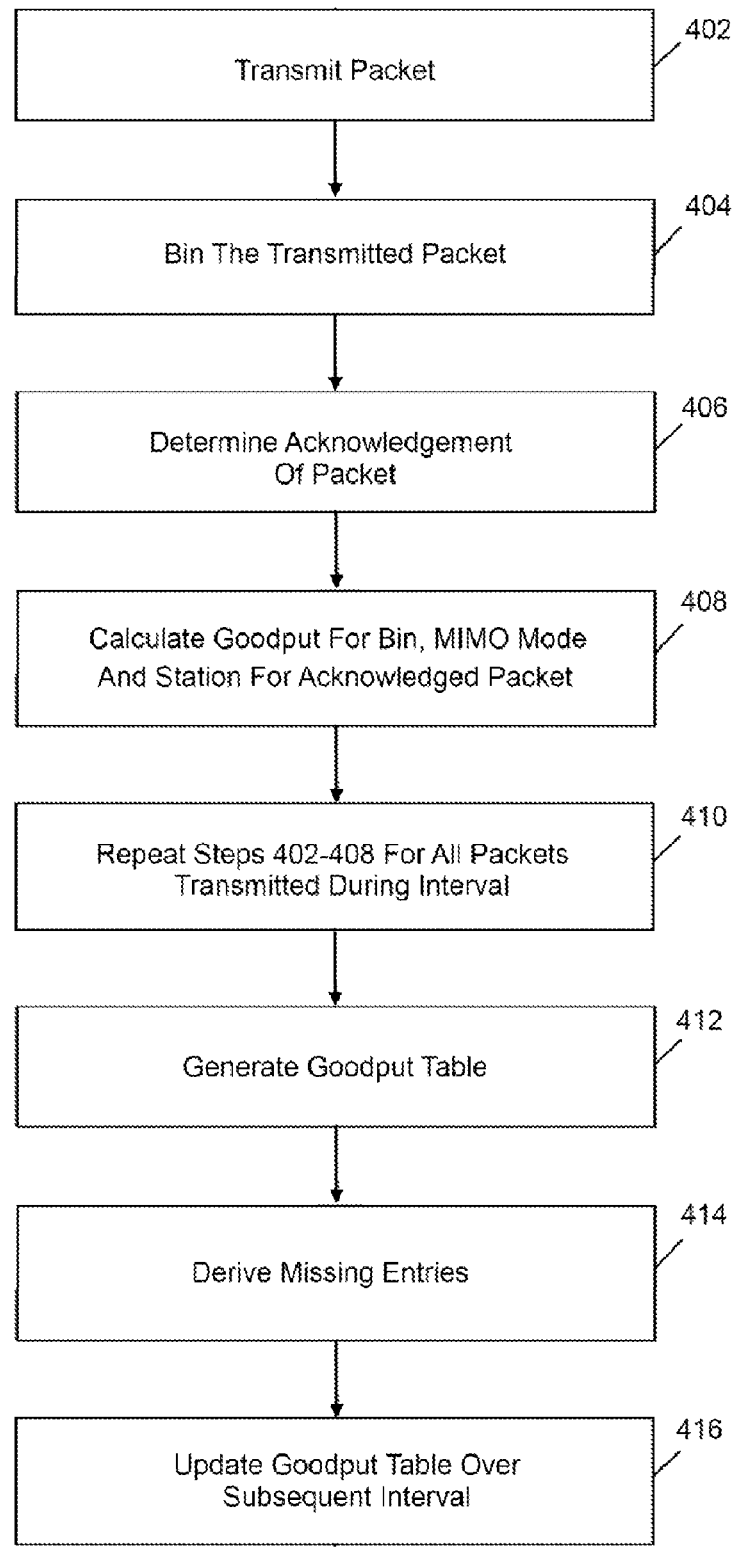
FIG. 4 is a flowchart showing an exemplary routine for determining goodput statistics based on acknowledged packet transmissions, according to one embodiment.

To help illustrate the techniques of this disclosure with regard to determining a statistical channel profile, an exemplary routine is represented in the flowchart of FIG. 4. Beginning with 402, a wireless communications device may transmit a first packet of information to a first station using a first MIMO mode at a first transmission time. In the context of MIMO system 100, the wireless communications device may be AP 102 and the first station may be one of STAs 104, 106 and 108. As noted above, the packet of information may be an MPDU addressed to the first station or may be a subframe of an A-MPDU containing an MPDU addressed to the first station. Depending upon the wireless protocol being employed, other packet formats may be used as desired. In 404, statistics estimator 250 may bin (place) the first packet in a first bin based, at least in part, on the first transmission time relative to a periodically recurring event, such as the transmission of sounding information. Next, in 406, statistics estimator 250 may determine that the first station has acknowledged receipt of the first packet. Using the acknowledgement, statistics estimator 250 may calculate a goodput value for the first bin, the first MIMO mode and the first station in 408. Statistics estimator 250 may repeat 402 through 408 for a plurality of packets sent over an interval defined by the periodically recurring event, such as a sounding interval as indicated by 410.

Additionally, statistics estimator 250 may generate a goodput table in 412, which includes entries for each bin, each station and each MIMO mode, with the entries populated by the goodput values determined from acknowledged packets. When a plurality of goodput values exist for a given entry, such as when more than one acknowledged MPDU for a given station in a given mode is sent during one bin, the goodput values may be combined to provide the total goodput for that bin. For any goodput table entries that are not populated (for example, if no MPDU is sent during the interval for a given combination of bin, station and mode), statistics estimator 250 may derive a goodput value using extrapolation or interpolation of values from adjacent bins as indicated by 414. Statistics estimator 250 may also determine new goodput values over one or more subsequent intervals and may update entries in the goodput table using the newly determined goodput value in 416.

By expressing channel statistics in terms of goodput, behavior of MIMO system 100 may be adapted to improve performance, such as by optimizing throughput or other suitable performance characteristics. For example, the goodput values determined by statistics estimator 250 may be used to group stations experiencing a similar type of channel in a common MU MIMO mode of operation to help achieve more efficient sounding and boost throughput. In another aspect, the goodput values determined by statistics estimator 250 may also be used to adapt the modulation and coding scheme based upon an estimation of the rate at which channel information becomes stale following a sounding event. In yet another aspect, AP 102 may aggregate packets within a given transmission opportunity based upon the rate of channel change.

The relationship of goodput to throughput also allows the goodput values determined by statistics estimator 250 to be used to estimate net throughput. In turn, net throughput may be used in various applications. For example, a MIMO system may offer a choice of antenna sets to use. By developing goodput statistics for each combination, selection of antennas may be optimized.

In one embodiment, the goodput values determined by statistics estimator 250 may be used to determine a sounding interval that improves performance. As will be described below, net throughput over time may be estimated. Then, an improved (and/or optimized) sounding interval may be determined by identifying a period of time that maximizes net throughput. While the below description uses the term "optimized," various embodiments of the disclosure may use any improved sounding interval that may not be "optimized" under the general meaning of the term. Therefore, the below examples and the disclosure in general should not be limited by use of such term.

First, statistics estimator 250 may estimate net throughput over time based on the determined goodput values. Net throughput achieved through a given bin l, wherein l≤k, may be determined by summing the amount of data successfully transmitted during each bin, from 1 to l, and dividing by the elapsed time through bin 1, including the time required for the sounding process. The goodput statistics for each bin may be used to estimate the data successfully sent during each bin. One suitable formulation of this calculation is given by equation (2):

$$\text{Net\_thrpt}(l) = \text{Sum}(i=1:l)\text{Succ\_Bits}(i)/(l*D + \text{sounding\_time}), \quad (2)$$

wherein D is the length of each bin, Succ_Bits(i) is an estimation of the amount of information that may be successfully transmitted during each bin for all stations and in all MIMO modes as calculated from the determined goodput values, and sounding_time is the amount of time required to transmit the sounding pattern, which may be calculated from the data rate being employed to transmit the sounding pattern.

A graph of net throughput over time may produce a generally concave curve in which the net throughput will rapidly increase after completion of the sounding process and successful transmission of data commences, overcoming the overhead associated with sounding. Next, the net throughput may approach a maximum that depends upon the theoretical throughput that may be achieved given the capabilities of MIMO system 100. The behavior of the curve following the initial rapid rise may depend upon characteristics of the channel. Accordingly, statistics estimator 250 may be configured to determine the lth bin at which net throughput is maximized. Correspondingly, the sounding may be optimized by selecting a sounding interval corresponding to the period of time from the end of the sounding process until the lth bin. One suitable formulation of this calculation is given by equation (3):

$$SI\_opt = \text{argmax}(\text{Net\_throughput}(l))*D \quad (3)$$

Figure 5:
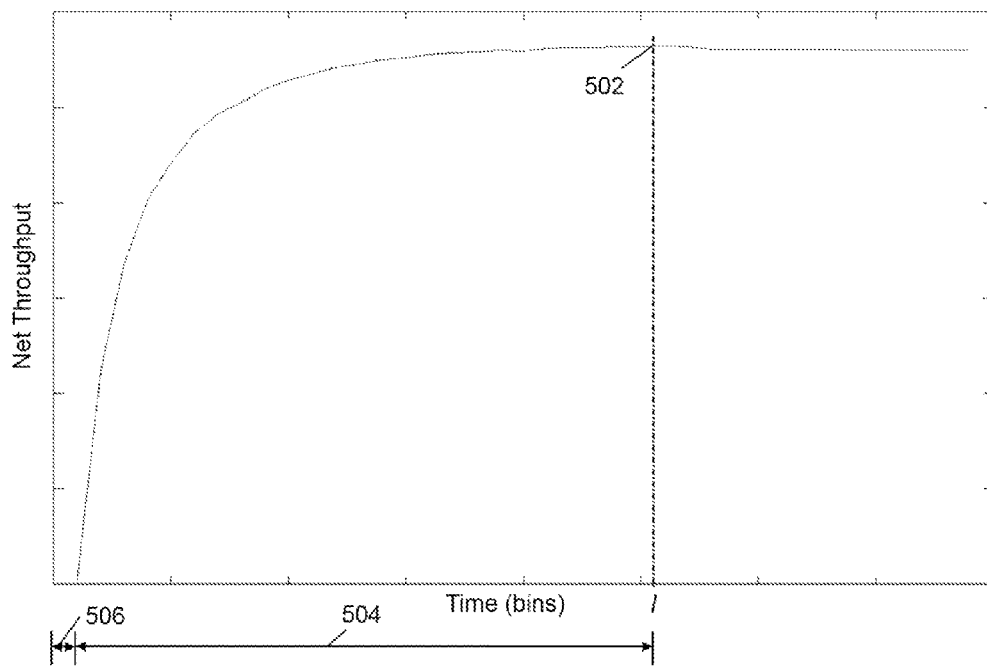
FIG. 5 depicts net throughput over time as used to determine a sounding interval in a static channel, according to one embodiment.

For example, FIG. 5 depicts a channel in a generally static condition. As shown, net throughput may reach a maximum throughput 502 corresponding to bin l. Optimized sounding interval 504 may be determined based on the period between the end of sounding process 506 and maximum throughput 502. Due to the static nature of the channel, it may remain constant for a relatively longer period of time. Thus, the channel estimation performed during sounding continues to be valid so that net throughput may remain relatively constant, by either gradually approaching the asymptote of time instant 502 or gradually decreasing as the channel changes over time.

Figure 6:
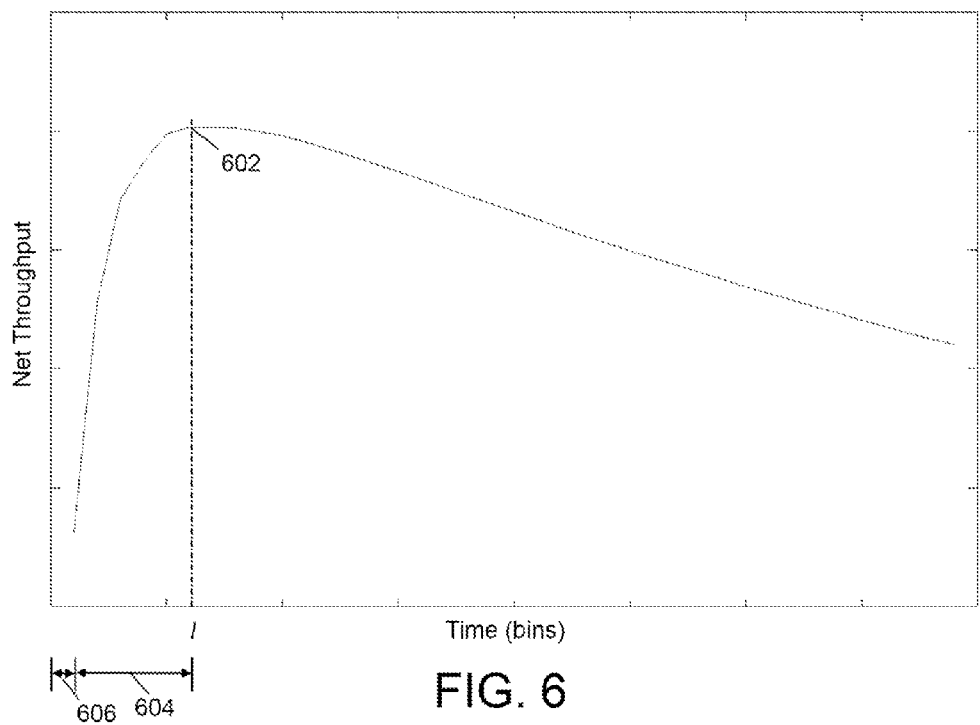
FIG. 6 depicts net throughput over time as used to determine a sounding interval in a time-varying channel, according to one embodiment.

In comparison, FIG. 6 depicts a more rapidly changing channel, such as may be experienced in a high Doppler environment resulting from relative motion between AP 102 and STAs 104, 106 and 108. As shown, net throughput may reach a maximum throughput 602 corresponding to bin l. Optimized sounding interval 604 may be determined based on the period between the end of sounding process 606 and maximum throughput 602. In this example, the channel estimate may become less accurate more quickly such that the net throughput degrades relatively rapidly over time after maximum throughput 602 is reached.

Figure 7:
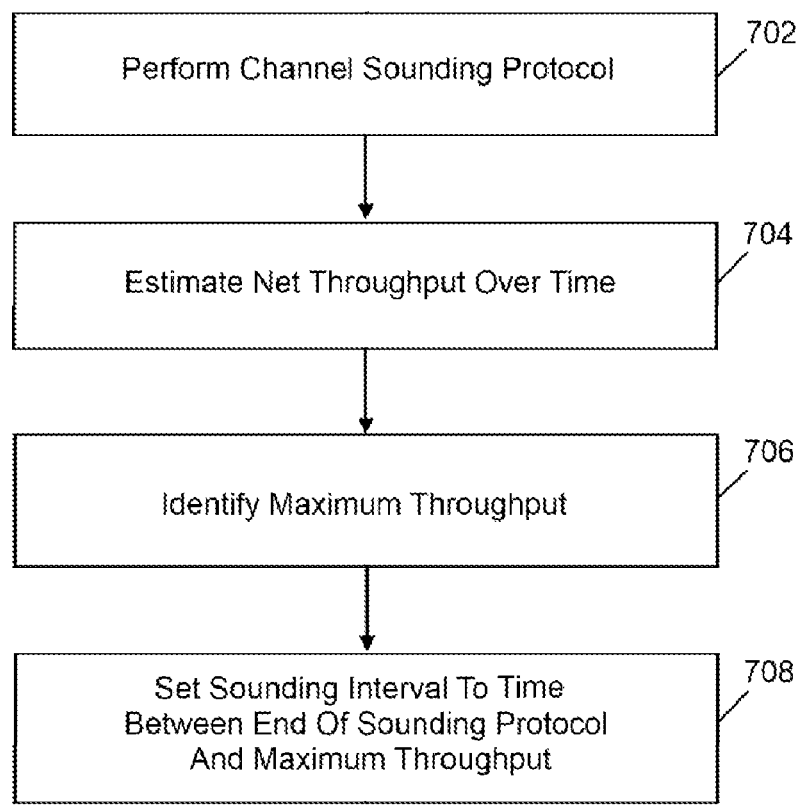
FIG. 7 is a flowchart showing an exemplary routine for determining a sounding interval, according to one embodiment.

To help illustrate the techniques of this disclosure with regard to determining an optimized sounding interval, an exemplary routine is represented by the flowchart of FIG. 7. Beginning with 702, a wireless communications device such as AP 102 may perform a channel sounding protocol. Next, in 704, statistics estimator 250 may be configured to estimate net throughput over a period of time commencing at an end of the channel sounding protocol. In one embodiment, net throughput may be estimated based on the determined goodput values as described above. Statistics estimator 250 may then identify a time instant corresponding to a maximum net throughput in 706 and correspondingly determine the optimized sounding interval in 708.

In another embodiment, AP 102 may employ the goodput values determined by statistics estimator 250 to select between the SU MIMO mode and MU MIMO modes when scheduling a packet for transmission to one of STAs 104, 106 and 108 to improve overall performance of MIMO system 100. Generally, statistics estimator 250 may estimate a net goodput that may be achieved using each of the available MIMO modes and AP 102 may select the MIMO mode associated with a desired net goodput, such as the greatest net goodput.

Statistics estimator 250 may determine net goodput for a given MIMO mode by calculating the amount of scheduled data that may be delivered to one of STAs 104, 106 and 108 over an upcoming sounding interval. The sounding interval may be determined from the goodput statistics as described above or may be determined using any other suitable method. Net goodput for a given MIMO mode and station may be the amount of data that may be delivered divided by the transmission time required to deliver the data and the overhead time associated with the sounding protocol. One formulation for determining net goodput is given by equation (4):

$$\text{Net\_goodput(mode)} = \text{Total\_Succ\_Bits(mode)}/(\text{Total\_PPDU\_time} + \text{sounding\_time}) \quad (4)$$

wherein Total_Succ_Bits is an estimate of the total amount of data to be delivered, Total_PPDU_time is the transmission time for the packets and sounding_time is the amount of time required to transmit the sounding pattern, which may be calculated from the data rate being employed to transmit the sounding pattern.

The total amount of data and PPDU transmission time used to estimate net goodput may be related to the total number of packets N that may be delivered during the next sounding interval. During operation of MIMO system 100, a transmit opportunity with regard to a given station may be awarded in a round-robin manner. Depending upon the usage rate of the wireless medium, one or more transmit opportunities may be awarded with regard to the given station during a sounding interval. The time between transmit opportunities may be termed a "round-robin interval" and may be determined based upon information gathered during a recent sounding interval. As such, the ratio of sounding interval to round-robin interval may be used to estimate the number of transmit opportunities in an upcoming sounding interval. Based on the number of transmit opportunities, statistics estimator 250 may also estimate the number of packets that may be transmitted to a station in SU MIMO mode.

Further, when operating in a MU MIMO mode, AP 102 may transmit a predetermined number of packets in a "burst" at each transmit opportunity. In such modes, the total number of packets that may be delivered may be determined by multiplying the number of packets in a burst by the number of transmit opportunities.

Alternatively, the length of the transmit queue of AP 102 may limit the data to be delivered, such that the total number of packets that may be delivered during the upcoming sounding interval may correspond to the length of the transmit queue in terms of packets. As a result, the total number of packets that will be delivered may be the minimum of either of these determinations.

Accordingly, in one embodiment the total number of packets N that may be sent is given by equation (5):

$$N=\text{Min}(Q,\text{ceiling}(S/R)*B) \quad (5)$$

wherein Q is the length of the transmit queue for the given station in terms of packets, S is the sounding interval, R is the round-robin interval and B is the number of packets in a MU MIMO burst or is one for SU MIMO.

Once statistics estimator 250 has estimated the total number of packets that may be delivered in the upcoming sounding interval, the total amount of data delivered may be calculated based upon the goodput statistics accumulated over previous sounding intervals and the transmission time may be determined from a rate control table. In turn, statistics estimator 250 may determine the net goodput for a given mode of operation of a station such that AP 102 may select the MIMO mode of operation that provides a desired net goodput.

Figure 8:
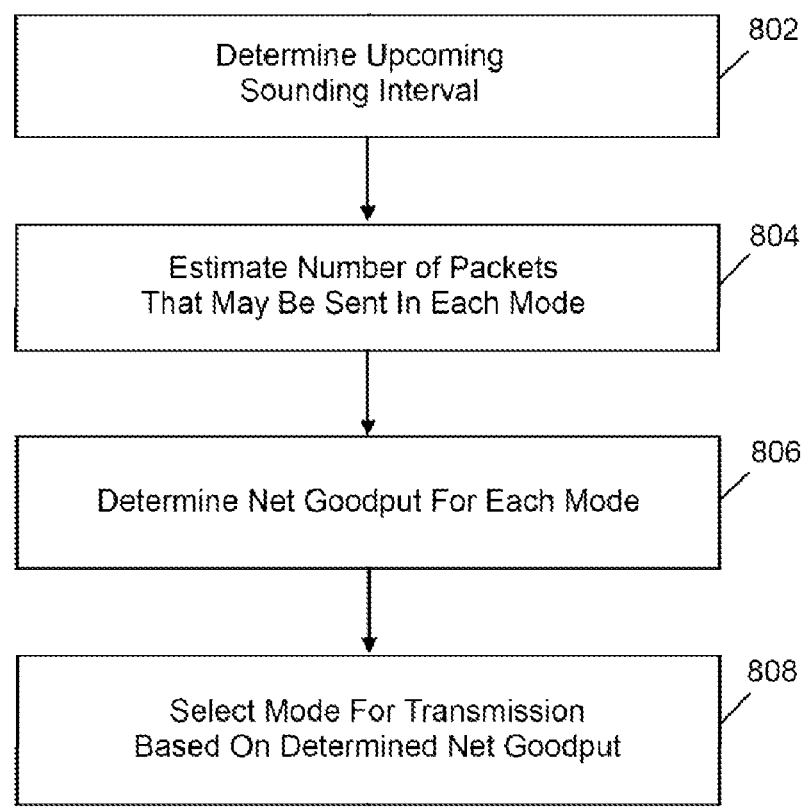
FIG. 8 is a flowchart showing an exemplary routine for selecting a MIMO mode to be used for transmission, according to one embodiment.

To help illustrate the techniques of this disclosure with regard to scheduling SU MIMO and MU MIMO modes of operation, an exemplary routine is represented by the flowchart of FIG. 8. Beginning with 802, a wireless communications device such as AP 102 may determine a length of an upcoming sounding interval. Next, in 804, statistics estimator 250 may be configured to estimate a number of packets that may be delivered to a station during the upcoming sounding interval. In one embodiment, the number of packets may be estimated using the determined goodput values as described above. Further, the number of packets may be estimated based on the number of packets in a multi user (MU) MIMO burst multiplied by a ratio of sounding interval to round-robin interval or based on the length of the transmit queue for the station. Statistics estimator 250 may then determine the net goodput for the station at each of a plurality of MIMO operating modes in 806 and AP 102 may schedule a transmission based on a desired net goodput in 708.

Described herein are presently preferred embodiments. However, one skilled in the art that pertains to the present invention will understand that the principles of this disclosure can be extended easily with appropriate modifications to other applications.

What is claimed is:

1. A method for communication in a multiple input multiple output (MIMO) system comprising:
   performing a channel sounding protocol during a first time period;
   defining a plurality of bins beginning with a first bin and extending from an end of the first time period;
   estimating net throughput during a second time period following the first time period by:
      selecting a second bin, subsequent to the first bin;
      summing bits that may be successfully transmitted during the first bin, the second bin, and intervening bins between the first bin and the second bin; and
      dividing the summed bits by a duration of time extending from the first bin to the second bin plus the first time period;
   determining a time corresponding to a maximum net throughput, wherein the time is within the second time period; and
   determining a sounding interval based, at least in part, on a third time period extending between the end of the first time period and the time corresponding to the maximum net throughput.

2. The method of claim 1, wherein estimating net throughput during the second time period comprises estimating a number of bits that may be successfully transmitted in each bin.

3. The method of claim 1, wherein determining the time corresponding to the maximum net throughput comprises selecting the second bin such that net throughput at the second bin is the maximum net throughput.

4. The method of claim 2, wherein estimating the number of bits that may be successfully transmitted in each bin comprises statistically determining goodput for each bin.

5. The method of claim 4, wherein statistically determining goodput comprises:
   transmitting a first plurality of packets of information over at least one preceding sounding interval initiated by performing a sounding protocol, wherein each packet has a transmission time, is addressed to at least one station and is transmitted in at least one MIMO mode;
   binning each packet of information in one bin of the plurality of bins based, at least in part, on the transmission time of each packet relative to the sounding protocol of the at least one preceding sounding interval; and
   determining a goodput value corresponding to the bin, the station and the MIMO mode for each packet that is acknowledged.

6. The method of claim 1, wherein determining the sounding interval comprises multiplying a number of bins between the first bin and the second bin, inclusive, by a duration of each bin.

7. A wireless communications device to operate in a multiple input multiple output (MIMO) system, comprising:
   a number of transmitter units to transmit a channel sounding protocol during a first time period; and
   a statistics estimator to:
      define a plurality of bins beginning with a first bin and extending from an end of the first time period;
      estimate net throughput during a second time period following the first time period by:
         selecting a second bin subsequent to the first bin;
         summing bits that may be successfully transmitted during the first bin, the second bin and intervening bins between the first bin and the second bin; and
         dividing the summed bits by a duration of time extending from the first bin to the second bin plus the first time period;
      determine a time corresponding to a maximum net throughput, wherein the time is within the second time period; and
      determine a sounding interval based, at least in part, on a third time period extending between the end of the first time period and the time corresponding to the maximum net throughput.

8. The wireless communications device of claim 7, wherein the statistics estimator is to estimate net throughput during the second time period by estimating a number of bits that may be successfully transmitted in each bin.

9. The wireless communications device of claim 7, wherein the statistics estimator is to determine the time corresponding to the maximum net throughput by selecting the second bin such that net throughput at the second bin is the maximum net throughput.

10. The wireless communications device of claim 8, wherein the statistics estimator is to estimate the number of bits that may be successfully transmitted in each bin based, at least in part, on a statistically determined goodput for each bin.

11. The wireless communications device of claim 10, wherein the transmitter units are to transmit a first plurality of packets of information over at least one preceding sounding interval initiated by performing a sounding protocol, wherein each packet has a transmission time, is addressed to at least one station and is transmitted in at least one MIMO mode; and
wherein the statistics estimator is to determine goodput by:
binning each packet of information in one bin of the plurality of bins based, at least in part, on the transmission time of each packet relative to the sounding protocol of the at least one preceding sounding interval; and
determining a goodput value corresponding to the bin, the station and the MIMO mode for each packet that is acknowledged.

12. The wireless communications device of claim 7, wherein the statistics estimator is to determine the sounding interval by multiplying a number of bins between the first bin and the second bin, inclusive, by a duration of each bin.

13. A non-transitory processor-readable storage medium for operating a multiple input multiple output (MIMO) wireless communications device, the processor-readable storage medium storing instructions that, when executed by a processor, cause the wireless communications device to:
perform a channel sounding protocol during a first time period;
define a plurality of bins beginning with a first bin and extending from an end of the first time period;
estimate net throughput during a second time period following the first time period by:
selecting a second bin subsequent to the first bin;
summing bits that may be successfully transmitted during the first bin, the second bin and intervening bins between the first bin and the second bin; and
dividing the summed bits by a duration of time extending from the first bin to the second bin plus the first time period;
determine a time corresponding to a maximum net throughput, wherein the time is within the second time period; and
determine a sounding interval based, at least in part, on a third time period extending between the end of the first time period and the time corresponding to the maximum net throughput.

14. The storage medium of claim 13, wherein the instructions to cause the wireless communications device to estimate net throughput during the second time period comprises instructions to cause the wireless communications device to estimate a number of bits that may be successfully transmitted in each bin.

15. The storage medium of claim 13, wherein the instructions to cause the wireless communications device to determine the time corresponding to the maximum net throughput comprises instructions to cause the wireless communications device to select the second bin such that net throughput at the second bin is the maximum net throughput.

16. The storage medium of claim 14, wherein the instructions to cause the wireless communications device to estimate the number of bits that may be successfully transmitted in each bin comprises instructions to cause the wireless communications device to statistically determine a goodput for each bin.

17. The storage medium of claim 16, wherein the instructions to cause the wireless communications device to statistically determine goodput comprises:
instructions to cause the wireless communications device to transmit a first plurality of packets of information over at least one preceding sounding interval initiated by performing a sounding protocol, wherein each packet has a transmission time, is addressed to at least one station and is transmitted in at least one MIMO mode;
instructions to cause the wireless communications device to bin each packet of information in one bin of the plurality of bins based, at least in part, on the transmission time of each packet relative to the sounding protocol of the at least one preceding sounding interval; and
instructions to cause the wireless communications device to determine a goodput value corresponding to the bin, the station and the MIMO mode for each packet that is acknowledged.

18. The storage medium of claim 13, wherein the instructions to cause the wireless communications device to determine the sounding interval comprises instructions to cause the wireless communications device to multiply a number of bins between the first bin and the second bin, inclusive, by a duration of each bin.

* * * * *